United States Patent [19]

Carson et al.

[11] Patent Number: 5,105,672
[45] Date of Patent: Apr. 21, 1992

[54] ROTARY DRIVE APPARATUS HAVING ONE MEMBER WITH SMOOTH OUTER PERIPHERAL SURFACE

[76] Inventors: Donald G. Carson, 12108 Towner Ave., NE., Albuquerque, N. Mex. 87112; Diamantis D. Preonas, 8618 LaSala Del Centro NE., Albuquerque, N. Mex. 87111

[21] Appl. No.: 662,253

[22] Filed: Feb. 28, 1991

Related U.S. Application Data

[63] Continuation-in-part of Ser. No. 525,255, May 17, 1990, abandoned, which is a continuation of Ser. No. 214,293, Jul. 1, 1988, abandoned, which is a continuation-in-part of Ser. No. 11,682, Feb. 6, 1987, abandoned.

[51] Int. Cl.[5] .............................................. F16H 7/02
[52] U.S. Cl. .................................... 74/89.22; 74/10.7; 74/500.5; 74/501.5 R; 74/506
[58] Field of Search .................. 74/89.2, 89.21, 89.22, 74/10.7, 501.5 R, 496, 506, 517, 500.5, 501.6

[56] References Cited

U.S. PATENT DOCUMENTS

| 1,808,777 | 6/1931 | Jones | 74/10.7 X |
| 2,121,906 | 6/1938 | Dunn | 74/89.21 |
| 2,404,377 | 7/1946 | Herbst | 74/10.7 X |
| 3,367,195 | 2/1968 | Racine | 74/89.2 |
| 4,351,197 | 9/1982 | Larson | 74/89.22 |

FOREIGN PATENT DOCUMENTS 111181 10/1928 Austria ............................ 74/10.7

Primary Examiner—Allan D. Herrmann

[57] ABSTRACT

Rotary drive apparatus includes first member journaled for rotation coupled by a cable to a second member also journaled for rotation, and at least one outer peripheral surface, on which the cable winds and unwinds, includes a smooth outer periphery. One of the rotatable members is the driving member, and the other rotatable member is the driven member.

22 Claims, 1 Drawing Sheet

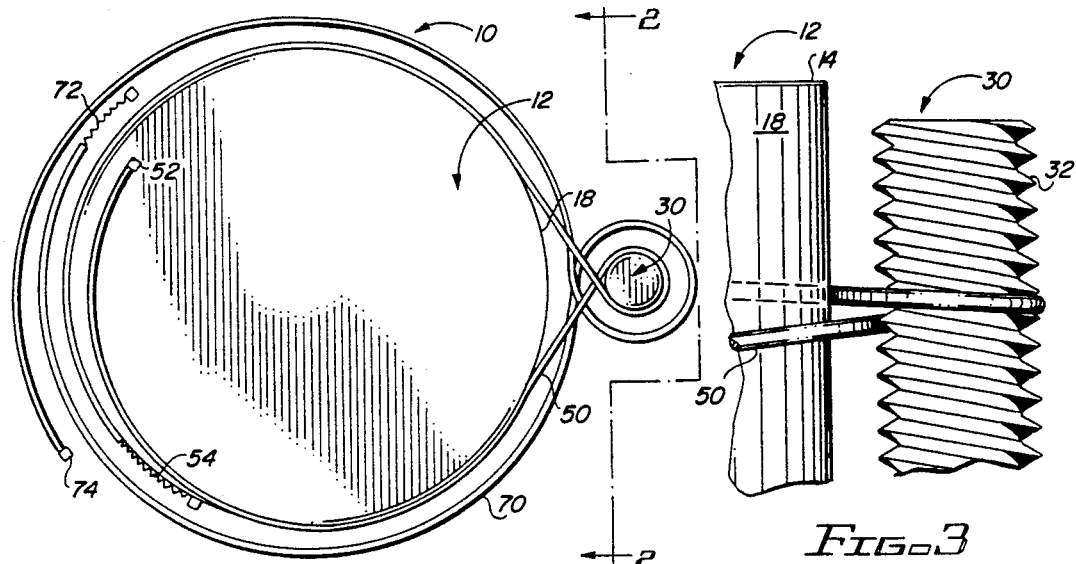
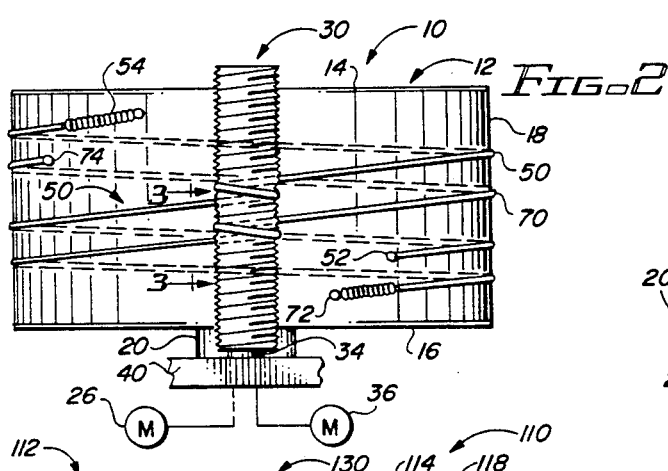
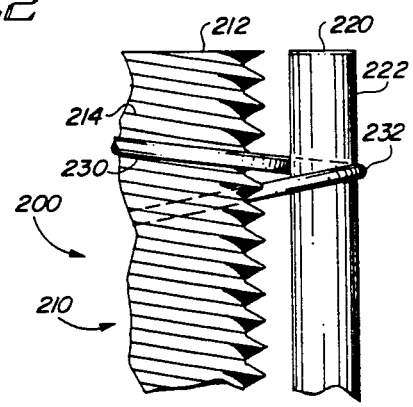
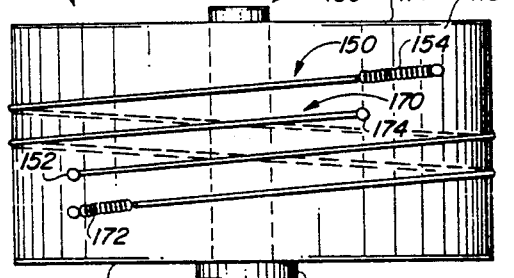
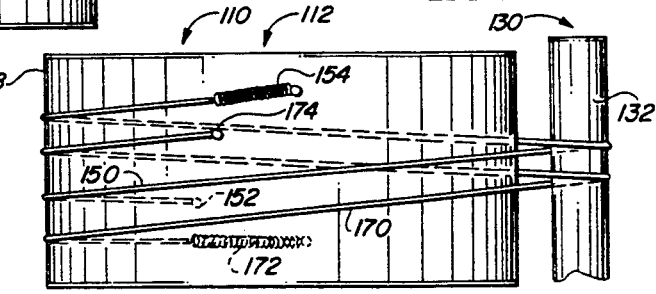
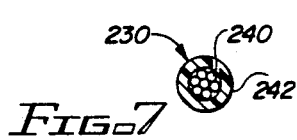

ROTARY DRIVE APPARATUS HAVING ONE MEMBER WITH SMOOTH OUTER PERIPHERAL SURFACE

CROSS REFERENCE TO RELATED APPLICATION

This application is a continuation-in-part of copending application Ser. No. 07/525,255, filed May 17, 1990, now abandoned, which was a continuation of copending application Ser. No. 07/214,293, filed July 1, 1988, now abandoned, which was a continuation-in-part application of copending application Ser. No. 07/011,682, filed Feb. 6, 1987, and now abandoned.

BACKGROUND OF THE INVENTION

1. Field of the Invention

This invention relates to rotary drive apparatus and, more particularly, to rotary drive apparatus having a driving member coupled by a cable to a driven member having a smooth outer peripheral surface.

2. Description of the Prior Art

U.S. Pat. No. 4,351,197 (Carson) discloses a rotary drive system in wich a threaded driving member is coupled to a driven member through a cable system. The driven member comprises a drum having a plurality of parallel grooves extending into the exterior surface. The coupling cable is disposed in the grooves on the exterior of the driven member and extends from each groove on the drum to adjacent threads on the driving member. The grooves on the driven member provide guidance for the cable as it moves onto and off of the driven member, and the grooves also provide additional surface for the frictional engagement of the cable. Thus, the cable is coupled frictionally to the driven drum in more than one location due to the presence of the grooves, if the grooves are V-shaped grooves, or there is frictional coupling over an extended area if the grooves are circular (semi-circular) to match the cable form.

The cost of machining the grooves on the driven member is an element to be considered in the overall cost of the rotary drive apparatus. In addition, the spacing between grooves on the drum must be correlated with the pitch of the threads on a driving member so that the cable goes onto and off of the drum and onto and off of the adjacent threads of the driving member at the same location. A small variation in the distance between the grooves on the driven member will, of course, result in potential problems as the driving member rotates to rotate the driven member.

To have a driven member without grooves is less expensive than the grooved member and, in addition, a greater degree of flexibility is allowed with respect to the diameter of the cable coupling the driving and driven members. Moreover, if the driven member is smooth, great flexibility results with respect to the number of consecutive turns about the driving member for every turn of the cable about the driven member. Thus, not only is the cost of the apparatus substantially reduced, but the inherent flexibility of the apparatus is substantially increased.

SUMMARY OF THE INVENTION

The invention described and claimed herein comprises rotary drive apparatus having a cable coupling a driving member to a driven member, and the one of the members includes a smooth exterior surface on which the cable is wound. In addition, the other member may also include a smooth exterior surface about which the cable is also wound.

Among the objects of the present invention are the following:

To provide new and useful rotary drive apparatus;

To provide new and useful rotary drive apparatus having a smooth outer peripheral surface on one of the members;

To provide new and useful rotary drive apparatus having a cable coupling a driving member to a driven member having a smooth exterior surface; and To provide new and useful rotary drive apparatus having a driving member with a smooth outer peripheral surface about which a cable is wound to couple the driving member to a driven member.

BRIEF DESCRIPTION OF THE DRAWING

FIG. 1 is a top view schematically illustrating the apparatus of the present invention.

FIG. 2 is a view of the apparatus of FIG. 1, taken generally along line 2—2 of FIG. 1.

FIG. 3 is an enlarged side view of the apparatus of FIG. 1.

FIG. 4 is an end view illustrating an alternate embodiment of the apparatus of the present invention.

FIG. 5 is a side view of the apparatus of FIG. 4.

FIG. 6 is a side view, partially broken away, illustrating another alternate embodiment of the apparatus of the present invention.

FIG. 7 is a view in partial section of a portion of the apparatus of the present invention.

DESCRIPTION OF THE PREFERRED EMBODIMENT

FIG. 1 is a top view of rotary drive apparatus 10 of the present invention. The rotary drive apparatus 10 includes a drum or cylinder 12 disposed adjacent to a screw element 30. The drum or cylinder 12 and the screw element 30 are coupled together by a pair of cables. The cables include an upper cable 50 and a lower cable 70.

FIG. 2 is a view of the drum or cylinder 12 and the screw 30 taken generally along line 2—2 of FIG. 1, showing details of the cables 50 and 70 disposed about the drum or cylinder 12 and the screw 30. FIG. 3 is an enlarged view of a portion of the cylinder 12 and the screw 30 and the cable 50. For the following discussion, reference will be made to FIGS. 1, 2, and 3.

The drum or cylinder 12 includes a top 14 and a bottom 16, which are generally parallel to each other. The drum or cylinder 12 also includes a smooth outer peripheral surface 18. The cables 50 and 70 are both terminated at both ends on the drum or cylinder 12. The cables 50 and 70 are shown in FIGS. 2 and 3 as extending helically about the drum 12 and also helically about the screw 30. As best shown in FIG. 3, the screw 30 includes a continuous helical groove 32. The cables 50 and 70 extend onto a helical groove from the drum and extend from the helical groove back onto the drum. As illustrated in FIG. 1, the cables 50 and 70 make only a single turn about the screw 30. That is, they stay in a helical groove 32 of the screw 30 for about a single turn, or nearly three hundred sixty degrees of the screw. If desired, the cables could extend more than a single turn about the screw before going off the screw and back onto the drum 12. Under some circumstances, it may be desirable to have a cable extend for more than a single turn on the screw. However, for illustrative purposes, a single turn is deemed sufficient.

The angle at which the cables 50 and 70 are disposed on the outer peripheral surface 18 of the drum 12 follows the angle of the helical threads or grooves 32 of the screw 30. Thus, as the screw rotates, and the cables 50 and 70 wind onto and off of the surface 18 of the drum 12, the cables will follow the general angle of the helix.

The lower end of the cable 50 is secured by a "hard" or solid termination 52 on the drum 12. The cable 50 then extends helically about the outer periphery 18 of the drum 12 to the screw 30, where it extends into the groove 32 and follows the groove, or is disposed in the helical groove 32, for about a single turn on the screw 30. The cable 50 then extends from the helical groove 32 of the screw back onto the outer peripheral surface 18 of the drum 12. The cable 50 is then terminated on the drum 12 by a tension spring 54. One end of the tension spring is appropriately secured to the drum 12, while the other end of the tension spring 54 is secured to the cable. The tension spring 54 provides a substantially constant tension on the cable 50 so that the cable 50 is under a substantially continuous tension at all times.

The cable 50 is illustrated as being the top or upper cable, and the cable 70 is illustrated as being the lower cable. The cables 50 and 70 are substantially parallel to each other, and spaced apart a predetermined, desired distance. The lower cable termination on the outer peripheral surface 18 of the drum 12 is through a tension spring 72. This is best shown in FIG. 2.

The cable 70 then extends helically about the outer peripheral surface of the drum 18 to the screw 30, where it extends also in a groove 32 for about one turn on the screw 30. The cable 70 then extends back onto the outer peripheral surface 18 of the drum 12 and is terminated by a hard or solid termination 74 on the drum 12.

It will be noted that the upper and lower terminations of the cables 50 and 70 are reversed. That is, the lower termination of the cable 52 is a hard termination, while the upper end termination of the cable 50 is terminated through a tension spring 54. For the cable 70, the lower termination is a spring termination through the tension spring 72, and the upper end termination is a hard or solid termination at 74. The springs 54 and 72 serve to provide constant tension for the respective cables 50 and 70. The terminations are illustrated as opposite, or reversed. However, depending on the particular application, the springs may be in parallel instead of reversed or opposite, as shown. Spring loading provides a uniform tensioning or pre-loading for the cables 50 and 70 about both the drum 12 and the screw 30.

In FIG. 2, the drum 12 is shown secured to a shaft 20. The screw 30 is shown secured to a shaft 34. The shafts 20 and 34 are both appropriately supported by or on, and journaled for rotation in, a base 40.

For illustrative purposes herein, two motors are schematically illustrated as being secured to the apparatus 10. The screw 30 is schematically illustrated as being coupled to a motor 36 so that when the motor 36 is actuated, the screw 30 becomes a driving element and the drum 12 becomes a driven elements. A motor 26 is shown in dotted line secured to the shaft 20. When the motor 26 is actuated, the shaft 20 rotates and the drum 12 becomes the driving element and the screw 30 becomes the driven element. It will be understood that either the screw 30 or the drum 12 may be considered as the driving element, and the other element would then be the driven element.

For many applications, the screw 30 will be the driving element for the precision rotation and positioning of the drum 12. For other applications, the drum 12 may be the driving element for substantially increasing the speed of rotation of the screw 30. Thus, an element to be positioned may be secured to the top 14 of the drum 12 for the precision positioning of such element in accordance with the rotation of the screw 30 as driven by the motor 36. In other situations, an appropriate element may be secured to the screw 30 for positioning of that element by rotation of the drum 12 in response to actuation of the motor 26.

Assuming the motor 36 is used to rotate the screw 30, and the screw 30 is thus the driving element, the cable coupling of the screw 30 and the drum 12 results in a concomitant rotation of the drum 12. It follows that there is no vertical or axial translation of either the drum 12 or the screw 30 as they jointly rotate. It will be noted that, with the cables 50 and 70 extending greater than three hundred sixty degrees about the outer periphery 18 of the drum 12, the drum 12 will be able to rotate substantially greater than three hundred sixty degrees. However, during that greater than three hundred sixty degrees of rotation of the drum 12, the screw 30 will rotate several times, depending on the ratio of the diameters of the cable pitch lines on the two elements, the drum 12 and the screw 30.

As has been discussed earlier, the cables 50 and 70 are disposed at an angle with respect to the vertical axis of the drum 12, and the angle with respect to the vertical axis is substantially identical to the angle of the helical screws or threads 32 of the screw 30. The cables 50 and 70 accordingly are always at the appropriate location for moving onto and off of the drum and the screw as the screw, the driving element, rotates, with the associated rotation of the drum 12 it follows that there is no vertical or axial translation of either the drum 12 or the screw 30 as they jointly rotate.

Under some circumstances it may be desirable to have both the driving element and the driven element with smooth outer peripheral surfaces. Such an arrangement is illustrated in FIGS. 4 and 5. FIG. 4 is a rear view of the apparatus 110, and FIG. 5 is a side view of the apparatus 110. For the following discussion, reference will be made primarily to FIGS. 4 and 5.

The alternate embodiment 110 includes a drum or cylinder 112 with a smooth outer peripheral surface 118. The drum 112 includes a generally flat or planar top 114, and also a bottom 116. The top 114 and the bottom 116 are illustrated as being substantially parallel to each other. The drum or cylinder 112 is appropriately secured to a shaft 120. The shaft 120 is, of course, appropriately journaled for rotation. Spaced a relatively short distance away from the drum 112 is a shaft 130. The shaft 130 includes a smooth outer peripheral surface 132.

The drum 112 and the shaft 130 are coupled together by a pair of cables 150 and 170. The cable 150 is referred to as the upper cable, and the cable 170 is referred to as the lower cable. The cables 150 and 170 are generally parallel to each other and they extend helically about the outer peripheral surfaces of both the drum 112 and the shaft 130.

On the drum 112, the cables 150 and 170 extend arcuately for a distance substantially greater than three hundred sixty degrees so that the rotation of the drum 130 may be greater than three hundred sixty degrees. The cables 150 and 170 extend helically about the shaft 130 for about three hundred sixty degrees. The actual extent of the angular disposition on the shaft 130 depends on the spacing between the drum 112 and the shaft 130 and also on the relative diameters, or on the ratio of the diameters, of the two elements. Obviously, the closer the two elements are together, and the greater the ratio of their diameters, the greater the extent of the angular disposition of the cables on the screw 130 for a single turn. That is, the closer the two elements are together, and the greater the ratio of their diameters, the more nearly the angular extent of a single turn about the shaft 130 will approach three hundred sixty degrees.

The farther away the two elements are, and the lesser the ratio of the two diameters, the less the angular extent of a single turn about the shaft 130. And, as discussed above, the cables 150 and 170 could be disposed about the shaft 130 for greater than a single turn.

As in the embodiment of FIGS. 1, 2, and 3, the cables 150 and 170 are terminated at one of their ends with a hard termination and at their opposite ends with a spring termination. As indicated, the springs may be in parallel, and the "hard" terminations may also be in parallel.

The lower termination of the upper cable 150 is a hard termination as at 152, and the lower termination of the cable 150 is by a tension spring termination 154. The lower cable 170 is terminated or secured to the drum 112 through a tension spring 172. The upper end of the cable 170 is appropriately secured or terminated to the drum 112 by a hard termination 174. The tension springs 154 and 172 may be substantially equal in their spring force, as may be the springs 72 and 54 discussed above. However, each cable is independent, and accordingly the springs may be different. In some applications, it may be preferable to have different spring rates and spring tensions.

While the angular orientation of the cables 50 and 70 of the embodiment of the apparatus 10 of FIGS. 1, 2, and 3, is determined by the pitch angle of the cables about helical threads 32 on the screw 30, the angular orientation of the cables 150 and 170 is not so determined or so constrained since the outer peripheral surface 132 of the shaft 130 is smooth. Accordingly, the helical arrangement or angular orientation of the cables 150 and 170 with respect to the axes of rotation of the drum 112 and the shaft 130 may be selected as appropriate under the circumstances.

For convenience, the greater the angular extent of movement of the drum 112, the greater will be the angular orientation of the cables. This is so for the simple reason of preventing the cables 150 and 170 from contacting or binding each other, or themselves, as the drum 112 and the shaft 130 rotate. Obviously, a relatively steep angle must be avoided since the shortest distance between any two points is a straight line, rather than a curved line, and the tendency accordingly would be for the cables to try to shorten the distance which they travel onto and off of the shaft as rotation occurs.

It will be obvious, as discussed above, that either the drum 112, with its relatively greater diameter, or the shaft 130, with its relatively lesser diameter, may be the driven or the driving element, depending on the desired effect. If the drum 112 is to be positioned in a precision manner, or rather elements secured to the drum 112 are to be positioned in a precision manner, it may be desirable to have the shaft 130 as the driving element and the drum 112 as the driven element. On the other hand, if an increase in speed or angular velocity of the shaft 130 is desired, then it may be desirable to have the drum 112 as the driving element and the shaft 130 as the driven element. Obviously, either may be the driving or the driven element.

FIG. 6 is a side view, partially broken away, of another alternate embodiment of the apparatus of the present invention. The alternate embodiment comprises rotary drive apparatus 200.

The rotary drive apparatus 200 comprises a drum 210 disposed adjacent to a shaft 222. The drum 210, of which only a portion is shown, includes a top surface 212 to which an element to be positioned may be secured. The drum 210 also includes a helically threaded outer peripheral surface 214.

Adjacent to the drum 210 is the shaft 220. The shaft 220 includes a smooth outer peripheral surface 222.

A cable 230 is shown extending about the helically threaded peripheral surface 214 of the drum 210 and making a single loop 232 about the smooth outer peripheral surface 222 of the shaft 220.

The rotary drive apparatus 200 includes a single member with a smooth outer peripheral surface, namely the shaft 222. The drum 210, the diameter of which is substantially greater than that of the shaft 220, includes a helically threaded or grooved outer peripheral surface. Thus, one of the members, in this case the relatively large diameter drum 210, includes an outer peripheral surface which is not smooth, but rather is grooved with helical grooves. The relatively small diameter member or shaft 220 includes a smooth outer peripheral surface.

It will be noted that the cable 230 is disposed about the shaft 220 at the same pitch angle on which it is disposed, or in the helical threads or grooves of the drum 210.

Two cables are illustrated in the drawings, but it is obvious that for some applications only a single cable may be desirable, and for some applications more than one or two cables may be desirable. The number of cables, for some applications, may be limited only by the practical size of the elements involved. FIG. 7 is a view in partial section of a cable usable with the apparatus of the present invention. Any of the cables, such as the cables 50 and 70 discussed above, may be multiple stranded steel cables with an outer coating or covering of plastic, or they may be of solid construction, or of metallic, fibrous, or plastic material, or of a combination thereof, and either malleable or hard. However, it will be understood that the cables of any particular apparatus will be substantially identical. Moreover, the use environment and the particular application will determine the particular material and construction for a cable.

A single strand cable is preferable for some environments, such as under water or in a space environment where outgassing may be a problem. Moreover, it is easier to provide a constant diameter throughout the length of a cable with only a single strand.

The ultimate smoothness in operation is achieved using a multiplicity or a plurality of cables, all of which have the same diameter throughout their lengths. Whether the cables are malleable or are hard, such as piano wire, a single strand may have a more constant diameter throughout its length than a stranded cable, even though the individual strands have the same diameter which are substantially constant throughout their lengths. However, there are applications when stranded cables are preferred.

One useful construction that combines stranded and solid elements is illustrated in partial section in FIG. 7. The cable 230 includes a plurality of strands 240, twisted together throughout their lengths in a manner that provides both strength and flexibility. The strands 240 are encased in a solid plastic covering 242 which provides additional strength, a smoother exterior, and abrasion resistance.

A characteristic of the cables is that they will "walk" axially up and down the smooth peripheral surface as the elements rotate. In addition, the cables roll. That is, they do not remain in a static condition as rotation of the rotary elements, the drum and the capstan, rotate relative to each other. There are both a rolling of the cable elements, on the peripheral surfaces and a walking of the cable elements vertically on the smooth peripheral surfaces. When threaded or helical members, such as the threaded member 30 of FIGS. 2 and 3, or the threaded member 210 of FIG. 6, are used, the cables are disposed in grooves, and accordingly cannot walk. However, the cables still roll in their grooves as rotation of the elements takes place. During the rotation of the elements, and during walking and rolling, the cables generally maintain their parallel orientation when two or more cables are used.

The helix angle of the cables illustrated in the Figures of the drawing are substantially exaggerated for purposes of illustration. In actuality, the helix angle is in the neighborhood of one degree or less, and rarely is it greater than two degrees, and is virtually always less than five degrees. Thus, the cables are wrapped at close to minimum spacing between them. The helix angle is maintained during rotation, regardless of walking and/or rolling.

In FIGS. 1, 3, 5, and 6 the spacing between the two elements varies. It will be understood that the closer the two elements are together, or the less the unsupported free space of the cables, the stiffer will be the system. Thus, for some systems, it may be desirable to have the two elements in very close proximity, or even touching. For other applications, it may be desirable to have substantial distances between the two elements.

For illustrative purposes, it will be noted that there is a substantial distance between the two rotary elements in the Figures. Indeed, for illustrative purposes, the cable 70 is shown in FIG. 1 spaced apart from the surface 18 of the drum 12. Moreover, only a single turn or coil is shown about the relatively small diameter members. As a practical matter, it may be desirable to have the two elements relatively close together. Moreover, multiple wraps or coils about both elements may be desirable to help prevent slippage.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What we claim is:

1. Rotary positioning apparatus comprising, in combination:

drum means having a generally smooth outer peripheral surface and having a first axis of rotation and having a first diameter;

shaft means disposed adjacent to the drum means and having an outer peripheral surface and having a second axis of rotation generally parallel to the first axis of rotation and having a second diameter which is substantially less than the first diameter; and cable means, including a multistranded and coated cable, secured to the drum means and extending helically about the outer peripheral surface of the drum means, helically onto and about the outer peripheral surface of the shaft means, and back onto and helically about the outer peripheral surface of the drum means of greater than 360 degrees of the drum means for coupling together the drum means and the shaft means for joint rotation of greater than 360 degrees of the drum means.

2. The apparatus of claim 1 in which the outer peripheral surface of the shaft means includes a helically threaded periphery, and the cable means extends in the helically threaded periphery.

3. The apparatus of claim 1 in which the cable means includes a first cable having a first end secured to the drum means and a second end secured to the drum means.

4. The apparatus of claim 3 in which the cable means further includes tension means securing the second end of the cable to the drum means.

5. The apparatus of claim 1 in which the outer peripheral surface of the shaft means is smooth.

6. The apparatus of claim 1 in which the cable means includes a plurality of multistranded and coated cables disposed generally parallel to each other on the drum means and the shaft means.

7. The apparatus of claim 1 in which the cable means includes a plurality of cables.

8. The apparatus of claim 1 in which the cable means includes a helix angle about the drum means and shaft means of less than five degrees.

9. The apparatus of claim 1 in which the cable winds onto and off of the drum means at a first pitch angle and onto and off the shaft means at the first pitch angle whereby there is no axial translation of the drum means and the shaft means as they jointly rotate.

10. Rotary positioning apparatus comprising, in combination:

drum means having a first outer peripheral surface and having a first axis of rotation and having a first diameter;

shaft means disposed adjacent to the drum means and having a second axis of rotation and having a second diameter which is less than the first diameter and having a second outer peripheral surface;

cable means secured to the drum means and extending helically about the first peripheral surface for greater than 360 degrees and about the second outer peripheral surface for coupling together the drum means and the shaft means for joint rotation of greater than 360 degrees of the drum means; and at least one outer peripheral surface of the first and second outer peripheral surfaces is smooth.

11. The apparatus of claim 10 in which both the first and the second outer peripheral surfaces are smooth.

12. The apparatus of claim 10 in which the first outer peripheral surface is grooved, and the cable means is disposed in the grooved first outer peripheral surface.

13. The apparatus of claim 12 in which the grooved first outer peripheral surface is helically grooved.

14. The apparatus of claim 10 in which the second outer peripheral surface is grooved.

15. The apparatus of claim 14 in which the grooved second outer peripheral surface is helically grooved.

16. The apparatus of claim 10 in which the cable means extends from the first outer periphery onto the second outer periphery, extends about the second outer periphery for at least a single loop, and then extends onto the first outer periphery.

17. The apparatus of claim 10 in which the cable means includes a pair of cables disposed generally parallel to each other on both the drum means and the shaft means.

18. The apparatus of claim 10 in which the cable means includes a plurality of cables.

19. The apparatus of claim 10 in which the cable means includes a helix angle on the drum means and the shaft means of less than five degrees.

20. The apparatus of claim 10 in which the cable means winds onto and off the drum means at a first pitch angle and onto and off the shaft means at the first pitch angle whereby there is no axial translation of the drum means and the shaft means as they jointly rotate.

21. The apparatus of claim 10 in which the cable means includes a cable made of synthetic material.

22. The apparatus of claim 10 in which the cable means includes a cable made of a malleable material.

* * * * *